United States Patent
Chiang et al.

(10) Patent No.: US 11,831,928 B2
(45) Date of Patent: Nov. 28, 2023

(54) METHOD AND APPARATUS OF COMBINED INTER AND INTRA PREDICTION WITH DIFFERENT CHROMA FORMATS FOR VIDEO CODING

(71) Applicant: HFI Innovation Inc., Zhubei (TW)

(72) Inventors: Man-Shu Chiang, Hsinchu (TW); Chih-Wei Hsu, Hsinchu (TW); Tzu-Der Chuang, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 17/764,385

(22) PCT Filed: Sep. 29, 2020

(86) PCT No.: PCT/CN2020/118961
§ 371 (c)(1),
(2) Date: Mar. 28, 2022

(87) PCT Pub. No.: WO2021/058033
PCT Pub. Date: Apr. 1, 2021

(65) Prior Publication Data
US 2022/0360824 A1    Nov. 10, 2022

Related U.S. Application Data

(60) Provisional application No. 62/907,699, filed on Sep. 29, 2019.

(51) Int. Cl.
*H04N 19/96* (2014.01)
*H04N 19/176* (2014.01)
(Continued)

(52) U.S. Cl.
CPC ........... *H04N 19/96* (2014.11); *H04N 19/176* (2014.11); *H04N 19/186* (2014.11); *H04N 19/1883* (2014.11)

(58) Field of Classification Search
CPC .... H04N 19/96; H04N 19/176; H04N 19/186; H04N 19/1883; H04N 19/119;
(Continued)

(56) References Cited

U.S. PATENT DOCUMENTS

2014/0169475 A1    6/2014  Zhang et al.
2020/0404278 A1*  12/2020  Ye ........................ H04N 19/14
(Continued)

FOREIGN PATENT DOCUMENTS

WO    2013/155028 A1    10/2013
WO    2019/147628 A1    8/2019

OTHER PUBLICATIONS

International Search Report and Written Opinion dated Dec. 30, 2020, issued in application No. PCT/CN2020/118961.
(Continued)

*Primary Examiner* — Matthew K Kwan
(74) *Attorney, Agent, or Firm* — Oblon, McClelland, Maier & Neustadt, L.L.P.

(57) ABSTRACT

A method and apparatus for video coding are disclosed. According to this method, a current block is received at an encoder side or compressed data comprising the current block is received at a decoder side, wherein the current block comprises one luma block and one or more chroma blocks, the current block is generated by partitioning an image area using a single partition tree into one or more partitioned blocks comprising the current block. A target coding mode is determined for the current block. The current block is then encoded or decoded according to the target coding mode, wherein an additional hypothesis of prediction for said one or more chroma blocks is disabled if the target coding mode corresponds to the multi-hypothesis prediction mode and width, height or area of said one or more chroma blocks is smaller than a threshold.

18 Claims, 5 Drawing Sheets

(51) Int. Cl.
*H04N 19/186* (2014.01)
*H04N 19/169* (2014.01)

(58) Field of Classification Search
CPC .... H04N 19/132; H04N 19/159; H04N 19/46; H04N 19/70; H04N 19/593; H04N 19/107
USPC .................................................. 375/240.26
See application file for complete search history.

(56) References Cited

U.S. PATENT DOCUMENTS

2021/0051336 A1* 2/2021 Chao ..................... H04N 19/176
2021/0067776 A1* 3/2021 Reuze .................. H04N 19/139
2021/0084309 A1* 3/2021 Zhao .................... H04N 19/159

OTHER PUBLICATIONS

Chiang, M.S., et al.; "CE10.1.4: Simplification of combined inter and intra prediction;" Joint Video Experts Team (JVET) of ITU-T SG 16 WP 3 and ISO/IEC JTC 1/SC 29/WG 11; Jan. 2019; pp. 1-3.
Chiang, M.S., et al.; "CE10.1.1: Multi-hypothesis prediction for improving AMVP mode, skip or merge mode, and intra mode;" Joint Video Experts Team (JVET) of ITU-T SG 16 WP 3 and ISO/IEC JTC 1/SC 29/WG 11; Oct. 2018; pp. 1-13.

* cited by examiner

METHOD AND APPARATUS OF COMBINED INTER AND INTRA PREDICTION WITH DIFFERENT CHROMA FORMATS FOR VIDEO CODING

CROSS REFERENCE TO RELATED APPLICATIONS

The present invention claims priority to U.S. Provisional Patent Application, Ser. No. 62/907,699, filed on Sep. 29, 2019. The U.S. Provisional Patent Application is hereby incorporated by reference in its entirety.

FIELD OF THE INVENTION

The present invention relates to prediction for video coding using CIIP (Combined Inter/Intra Prediction). In particular, the present invention discloses techniques to improve processing throughput for small block sizes.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions.

After the development of HEVC standard, another merging video coding standard, named as Versatile Video Coding (VVC), is being developed under Joint Video Exploration Team (JVET) of ITU-T SG 16 WP 3 and ISO/IEC JTC 1/SC 29/WG 11. Various new coding tools along with some existing coding tools have been evaluated for VVC.

In VTM (VVC Test Model) software, when a CU is coded in Merge mode, and if the CU contains at least 64 luma samples (i.e., CU width×CU height equal to or larger than 64), an additional flag (CIIP flag) is signalled at CU level to indicate if the Combined Inter/Intra Prediction (CIIP) mode is applied to the current CU. In order to form the CIIP prediction, an Intra prediction mode is first derived from two additional syntax elements or implicitly assigned. For example, planar mode is implicitly assigned as the Intra prediction mode. For another example, up to four possible Intra prediction modes can be used: DC, planar, horizontal, or vertical. The Inter prediction (the existing hypothesis of prediction) and Intra prediction signals (the additional hypothesis of prediction) are then derived using regular Intra and Inter decoding processes. Finally, weighted averaging of the Inter and Intra prediction signals is performed to obtain the CIIP prediction. A more detailed explanation of the algorithm can be found in JVET-L0100 (M.-S. Chiang, et al., "CE10.1.1: Multi-hypothesis prediction for improving AMVP mode, skip or merge mode, and intra mode," ITU-T SG 16 WP 3 and ISO/IEC JTC 1/SC 29/WG 11, 12th Meeting: Macao, CN, October 2018, Document: JVET-L0100).

Triangular Prediction

For VTM, in JVET-L0124 (R.-L. Liao, et al., "CE10.3.1.b: Triangular prediction unit mode," ITU-T SG 16 WP 3 and ISO/IEC JTC 1/SC 29/WG 11, 12th Meeting: Macao, CN, October 2018, Document: JVET-L0124) and JVET-L0208 (T. Poirier, et al., "CE10 related: multiple prediction unit shapes," ITU-T SG 16 WP 3 and ISO/IEC JTC 1/SC 29/WG 11, 12th Meeting: Macao, CN, October 2018, Document: JVET-L0208), the scenario of Triangular Prediction unit Mode (TPM) is proposed. The concept is to introduce a new triangular partition for motion compensated prediction. It splits a CU into two triangular prediction units, in either diagonal or inverse diagonal direction like FIG. 1. Each triangular prediction unit in the CU is Inter-predicted using its own uni-prediction motion vector and reference frame. An adaptive weighting process is performed to the diagonal edge after predicting the triangular prediction units. Then, the transform and quantization process are applied to the whole CU. It is noted that this mode is only applied to skip and merge modes. An additional flag is signalled to indicate if TPM is applied.

Adaptive Weighting Process

After predicting each triangular prediction unit, an adaptive weighting process is applied to the diagonal edge between the two triangular prediction units to derive the final prediction for the whole CU. Two weighting factor groups are listed as follows:

First weighting factor group: {7/8, 6/8, 4/8, 2/8, 1/8} and {7/8, 4/8, 1/8} is used for the luminance and the chrominance samples, respectively;

Second weighting factor group: {7/8, 6/8, 5/8, 4/8, 3/8, 2/8, 1/8} and {6/8, 4/8, 2/8} are used for the luminance and the chrominance samples, respectively.

One weighting factor group is selected based on the comparison of the motion vectors of two triangular prediction units. The second weighting factor group is used when the reference pictures of the two triangular prediction units are different from each other or their motion vector difference is larger than 16 pixels. Otherwise, the first weighting factor group is used. An example is shown in FIG. 2, where weightings 210 are shown for the luma block and weightings 220 are shown for the chroma block. A more detailed explanation of the algorithm can be found in WET-L0124 and WET-L0208.

Geometric Merge Mode (GEO)

Geometric Merge mode (also called geometric partitioning mode, GPM) is proposed in JVET-P0068 (H. Gao, et al., "CE4: CE4-1.1, CE4-1.2 and CE4-1.14: Geometric Merge Mode (GEO)", ITU-T SG 16 WP 3 and ISO/IEC JTC 1/SC 29/WG 11, 16th Meeting: Geneva, CH, 1-11 Oct. 2019, Document: P0068), which uses the same predictors blending concept as TPM and extends the blending masks up to 140 different modes with 32 angles and 5 distance offsets.

The 140 modes is defined as CE4-1.1 in P0068. To further reduced the complexity, in CE4-1.2 108 modes and 80 modes GEO are tested. In CE4-1.14, a TPM-like simplified motion storage is tested.

FIG. 3A illustrates partition shapes (311-312) for TPM in VTM-6.0 and FIG. 3B illustrates additional shapes (313-319) being proposed for non-rectangular Inter blocks.

Similarly to TPM, the proposed GEO partitioning for Inter is allowed for uni-predicted blocks not smaller than 8×8 in order to have the same memory bandwidth usage as the bi-predicted blocks at the decoder side. Motion vector prediction for GEO partitioning is aligned with TPM. Also, the TPM blending between two predictions is applied on inner boundary.

The split boundary of geometric Merge mode is described by angle $\varphi_i$ and distance offset $\rho_i$ as shown in FIG. 4. Angle $\varphi_i$ represents a quantized angle between 0 and 360 degrees and distance offset $\rho_i$ represents a quantized offset of the largest distance $\rho_{max}$. In addition, the split directions overlapped with binary tree splits and TPM splits are excluded.

GEO angle and distance quantization.

Angles $\varphi_i$ is quantized between 0 and 360 degrees with a fixed step. In CE4-1.1, CE4-1.2 with 108 modes and CE4-1.14, the angle $\varphi_i$ is quantized from between 0 and 360 degrees with step 11.25 degree, which results in a total 32 of angles as shown in FIG. 5A.

In CE4-1.2 with 80 modes, the angle $\varphi_i$ is still quantized with 11.25 degrees steps; however the near vertical direction angles (e.g., near horizontal split boundaries) are removed since in the nature values, objectives and motions are mostly horizontal. FIG. 5B illustrates the reduced angles with 24 values.

Distance $\rho_i$ is quantized from the largest possible distance $\rho_{max}$ with a fixed step. The value $\rho_{max}$ of can be geometrically derived by Eq. (1) for either w or h equal to 8 and scaled with log 2 scaled short edge length. For $\varphi$ equal to 0 degree case, $\rho_{max}$ is equal to w/2, and for $\varphi$ equal to 90 degree case, $\rho_{max}$ is equal to h/2. The shifted back "1.0" samples is to avoid that the split boundary is too close to the corner.

$$\rho_{max}(\varphi, w, h) = \cos(\varphi)\left(\frac{h}{2\tan\left(\frac{\pi}{2} - \varphi\right)} + \frac{w}{2}\right) - 1.0, 0 < \varphi < \frac{\pi}{2} \quad (1)$$

In CE4-1.1 and CE4-1.14, the distance r is quantized with 5 steps. Combining with 32 angles, there is a total of 140 split modes excluding the binary tree and TPM splits. In CE4-1.2, the distance $\rho_i$ is quantized with 4 steps. Combining with 32 angles, there is a total of 108 split modes excluding the binary tree and TPM splits. In CE4-1.2, the distance $\rho_i$ is quantized with 4 steps. Combining with 24 angles, there is a total of 80 split modes excluding the binary tree and TPM splits.

Mode Signalling

According to the proposed method, the GEO mode is signalled as an additional Merge mode together with TPM mode as shown in Table 1.

TABLE 1

| Syntax elements introduced by the proposal | |
| --- | --- |
| if( !ciip_flag[ x0 ][ y0 ] && MaxNumTriangleMergeCand > 1 ) { | |
|   if (cbWidth > = 8 && cbHeight >= 8 ) | |
|     merge_geo_flag[ x0 ][ y0 ] | ae(v) |
|   if ( merge_geo_flag[ x0 ][ y0 ] ) | |
|     merge_geo_idx[ x0 ][ y0 ] | ae(v) |
|   else | |
|     merge_triangle_split_dir[ x0 ][ y0 ] | ae(v) |
|     merge_triangle_idx0[ x0 ][ y0 ] | ae(v) |
|     merge_triangle_idx1[ x0 ][ y0 ] | ae(v) |
| } | |

The merge_geo_flag[ ] is signalled with 4 CABAC context models, where the first three are derived depending on the mode of above and left neighbouring blocks, the fourth is derived depending on the aspect ratio of the current block. The merge_geo_flag[ ][ ] indicates whether the current block uses GEO mode or TPM mode, which is similar to a "most probable mode" flag.

The geo_partition_idx[ ][ ] is used as an index to the lookup table that stores the angle $\varphi_i$ and distance $\rho_i$ pairs. The geo_partition_idx is coded using truncated binary and binarized using bypass.

BRIEF SUMMARY OF THE INVENTION

A method and apparatus for video coding are disclosed. According to this method, a current block is received at an encoder side or compressed data comprising the current block is received at a decoder side, wherein the current block comprises one luma block and one or more chroma blocks, the current block is generated by partitioning an image area using a single partition tree into one or more partitioned blocks comprising the current block, and one or more coding tools comprising a multi-hypothesis prediction mode is allowed for the current block. The single partition tree is a single tree for luma and chroma. A target coding mode is determined for the current block. The current block is then encoded or decoded according to the target coding mode, wherein an additional hypothesis of prediction for said one or more chroma blocks is disabled if the target coding mode corresponds to the multi-hypothesis prediction mode and width, height or area of said one or more chroma blocks is smaller than a threshold.

In one embodiment, the additional hypothesis of prediction for said one or more chroma blocks is disabled if the width of said one or more chroma blocks is smaller than the threshold and the threshold is equal to 4.

In one embodiment, the multi-hypothesis prediction mode corresponds to Combined Inter/Intra Prediction (CIIP) mode. In another embodiment, the multi-hypothesis prediction mode corresponds to Triangular Prediction mode (TPM). In yet another embodiment, the multi-hypothesis prediction mode corresponds to Geometric Merge mode (GEO).

In one embodiment, the current block is in chroma format 4:4:4, 4:2:2 or 4:2:0.

In one embodiment, the threshold is predefined implicitly in the standard or signalled at a Transform Unit (TU) or Transform Block (TB), Coding Unit (CU) or Coding Block (CB), Coding Tree Unit (CTU) or Coding Tree Block (CTB), slice, tile, tile group, Sequence Parameter Set (SPS), Picture Parameter Set (PPS), or picture level of a video bitstream.

In one embodiment, the image area corresponds to a Coding Tree Unit (CTU).

DETAILED DESCRIPTION OF THE INVENTION

Figure 1:
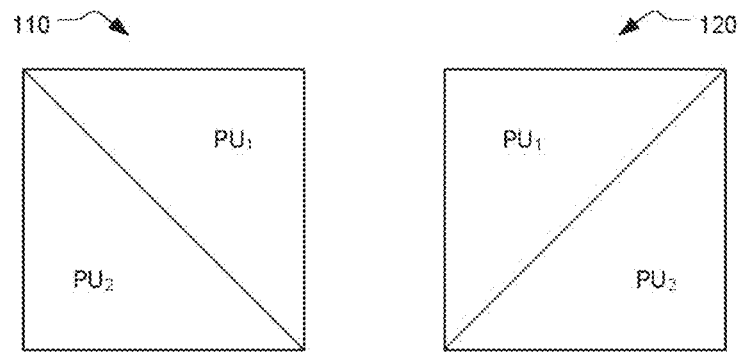
FIG. 1 illustrates an example of TPM (Triangular Prediction Mode), where a CU is split into two triangular prediction units, in either diagonal or inverse diagonal direction. Each triangular prediction unit in the CU is Inter-predicted using its own uni-prediction motion vector and reference frame index to generate prediction from a uni-prediction candidate.
Figure 2:
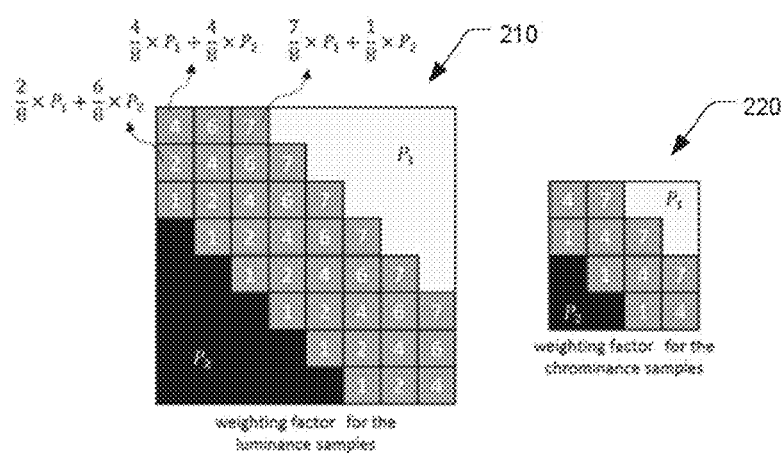
FIG. 2 illustrates an example of adaptive weighting process, where weightings are shown for the luma block (left) and the chroma block (right).
Figure 3A:
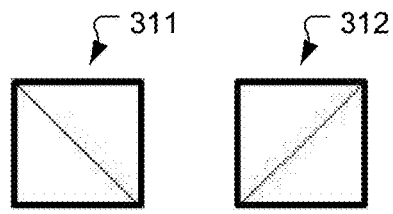
FIG. 3A illustrates partition shapes for the triangular prediction mode (TPM) as disclosed in VTM-6.0
Figure 3B:
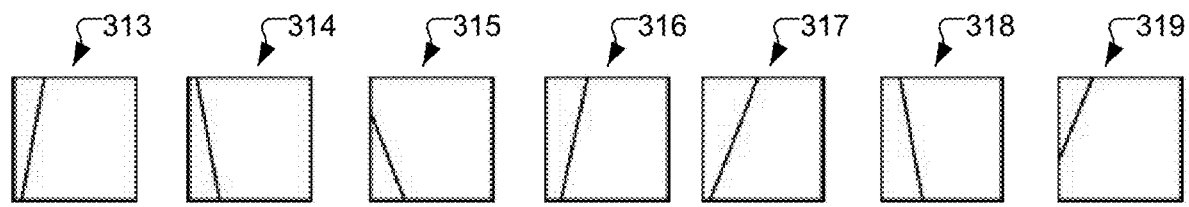
FIG. 3B illustrates additional shapes being discussed for geometric Merge mode.
Figure 4:
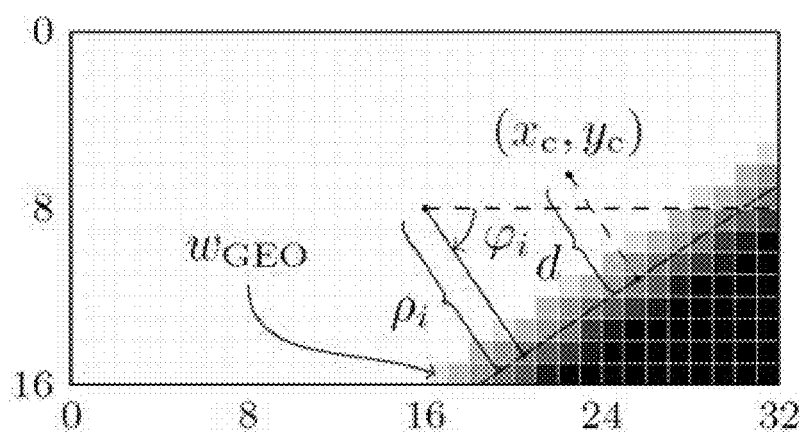
FIG. 4 illustrates the split boundary of geometric Merge mode that is described by angle $\varphi_i$ and distance offset $\rho_i$.
Figure 5A:
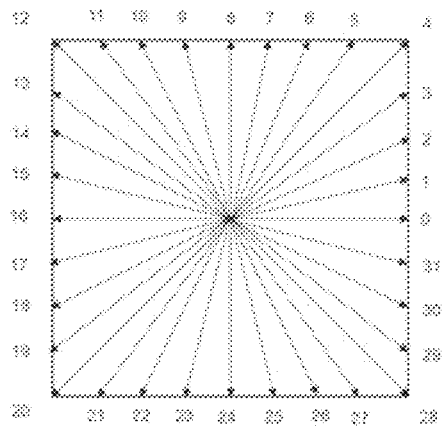
FIG. 5A illustrates an example where the angle $\varphi_i$ is quantized from between 0 and 360 degrees with step 11.25 degree, which results in a total 32 of angles.
Figure 5B:
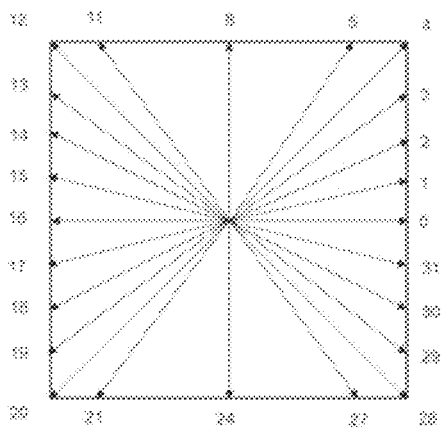
FIG. 5B illustrates an example where the angle $\varphi_i$ is quantized from between 0 and 360 degrees with step 11.25 degree and some near vertical direction angles are removed, which results in a total 24 of angles.

The following description is of the best-contemplated mode of carrying out the invention. This description is made for the purpose of illustrating the general principles of the invention and should not be taken in a limiting sense. The scope of the invention is best determined by reference to the appended claims.

To improve the coding efficiency, a multiple hypothesis (MH) prediction mode is disclosed. When the current block is using an MH prediction mode, an additional hypothesis of prediction is combined with the existing hypothesis of prediction by a weighted average process and the combined prediction is the final prediction of the current block. In order to overcome processing efficiency issue associated with small blocks, a simplification method of multiple hypothesis (MH) prediction mode is disclosed, where the MH prediction mode is not applied to chroma blocks under certain conditions according to this invention. When the MH prediction mode is not applied to chroma blocks, it means that the additional hypothesis of prediction is not combined with the exiting hypothesis of prediction for the chroma block and the existing hypothesis of prediction is used as the final prediction of the current chroma block. When the MH prediction mode is applied to chroma blocks, it means that the additional hypothesis of prediction is combined with the exiting hypothesis of prediction and the combined prediction is used as the final prediction of the current chroma block. When the proposed method is enabled and the pre-defined condition is satisfied, the proposed method is then applied.

In one embodiment, MH prediction mode can be CIIP, TPM, or GEO.

In another embodiment, the proposed method can be applied even if the original flag for MH mode (e.g., CIIP, TPM, or GEO) at the CU level is true. For example, MH mode is not applied to the chroma blocks even if the CU-level CIIP flag is true. It means that the final prediction for the luma block is the combined prediction, which is formed by the existing hypothesis of prediction and the additional hypothesis of prediction; for chroma blocks, the final prediction is the existing prediction.

Current VVC supports a flexible partitioning mechanism including QT, BT, and TT.

In this split structure, the block size may range from 128 to 4 for the luma component or from 64 to 2 for the chroma components. The introduction of small block sizes, i.e., 2×N, leads to an inefficient hardware implementation. It causes pipeline delay and requires 2×N pixels process in the hardware architecture. In most hardware implementations, 4×1 pixel per 1 CPU (or GPU) clock is used for luma and chroma. However, it is asserted that an extra 2×2 pixel per 1 clock processing is needed for 2×N blocks. In addition, the memory access (reading and writing) is inefficient with 2×N, because in each access only 2×1 pixels are fetched. Intra blocks have more dependency than inter blocks. The most concern is about 2×N intra blocks. The smallest size for luma is already set as 4×4. 2×N intra chroma is already removed in the dual tree cases. However, there are still some 2×N intra chroma blocks in single tree cases (for example, 2×N intra chroma blocks for CIIP.) In order to solve such issue, in another embodiment, "MH mode is not applied to the chroma blocks" means that additional hypothesis of prediction is not combined with the original (existing) hypothesis of prediction for chroma blocks. In the case of CIIP, "MH mode is not applied to the chroma blocks" means that for the chroma blocks, Intra prediction is not combined with Inter prediction so that Inter prediction is used directly.

In another embodiment, the proposed method is enabled for chroma format 4:4:4.

In another embodiment, the proposed method is enabled for chroma format 4:2:0.

In another embodiment, the proposed method is enabled for chroma format 4:2:2.

In another embodiment, the proposed method is enabled for chroma format 4:2:1.

In another embodiment, the proposed method is enabled for chroma format 4:1:1.

In another embodiment, the proposed method is enabled for chroma format 4:0:0 (i.e., mono chroma).

In another embodiment, the pre-defined condition is in terms of block width, height, or area.

In one sub-embodiment, "block" is this embodiment can be a luma block or a chroma block. When the block means a chroma block, the corresponding block width or height depends on the used chroma format. For example, if the used chroma format is 4:2:0, the corresponding block width is assigned with the half of the width for the collocated luma block.

In one sub-embodiment, the pre-defined condition is that the block width is smaller than threshold-1 and/or the block height is smaller than threshold-2. For example, when CIIP flag is enabled and the block width of the corresponding chroma block is smaller than 4, the proposed method (MH prediction mode is not applied to the chroma block) is used. The chroma block can be a chroma block for Cb component or Cr component.

In another sub-embodiment, the pre-defined condition is that the block width is larger than threshold-1 and/or the block height is larger than threshold-2.

In another sub-embodiment, the pre-defined condition is that the block area is smaller than threshold-3.

In another sub-embodiment, the pre-defined condition is that the block area is larger than threshold-3.

In another embodiment, threshold-1 can be a positive integer such as 1, 2, 4, 8, 16, 32, 64, 128, 256, 512, or 1024.

In another embodiment, threshold-1 can be a variable defined in TU (or TB), CU (or CB), CTU (or CTB), slice, tile, tile group, SPS, PPS, or picture level. The variable is 1, 2, 4, 8, 16, 32, 64, 128, 256, 512, or 1024.

In another embodiment, threshold-2 can be a positive integer such as 1, 2, 4, 8, 16, 32, 64, 128, 256, 512, or 1024.

In another embodiment, threshold-2 can be a variable defined in TU (or TB), CU (or CB), CTU (or CTB), slice, tile, tile group, SPS, PPS, or picture level. The variable is 1, 2, 4, 8, 16, 32, 64, 128, 256, 512, or 1024.

In another embodiment, threshold-3 can be a positive integer such as 1, 2, 4, 8, 16, 32, 64, 128, 256, 512, or 1024.

In another embodiment, threshold-3 can be a variable defined in TU (or TB), CU (or CB), CTU (or CTB), slice, tile, tile group, SPS, PPS, or picture level. The variable can be 1, 2, 4, 8, 16, 32, 64, 128, 256, 512, or 1024.

In another sub-embodiment, threshold-1 and threshold-2 can be the same.

In another sub-embodiment, threshold-1, threshold-2, and/or threshold-3 can be different for different chroma formats.

In another embodiment, the "block" in this invention can be CU, CB, TU or TB.

In another embodiment, the proposed method is enabled depending on an explicit flag at TU (or TB), CU (or CB), CTU (or CTB), slice, tile, tile group, SPS, PPS, or picture level.

In another embodiment, the proposed method can be used for the luma block, i.e., the multiple hypothesis (MH) prediction mode is not applied to the luma blocks under certain conditions. When the proposed method is enabled and the pre-defined condition is satisfied, the proposed method is applied.

Any combination of the above methods can be applied. For example, when chroma format 4:4:4 is used and when the chroma block width or height is smaller than 4, MH mode is not applied to chroma. For another example, when chroma format 4:2:0 is used and the chroma block width (depending on the used chroma format) is smaller than 4, MH mode is not applied to chroma. In other words, when other enabling conditions of MH mode are satisfied (e.g. assuming MH mode is CIIP, CIIP flag is enabled) and the chroma block width (depending on the used chroma format) is larger than or equal to 4, MH mode is applied to not only the luma block but also chroma blocks.

Any of the foregoing proposed methods can be implemented in encoders and/or decoders. For example, any of the proposed methods can be implemented in an Intra/Inter coding module of an encoder, a motion compensation module, a merge candidate derivation module of a decoder. Alternatively, any of the proposed methods can be implemented as a circuit coupled to the Intra/Inter coding module of an encoder and/or motion compensation module, a Merge candidate derivation module of the decoder.

Figure 6:
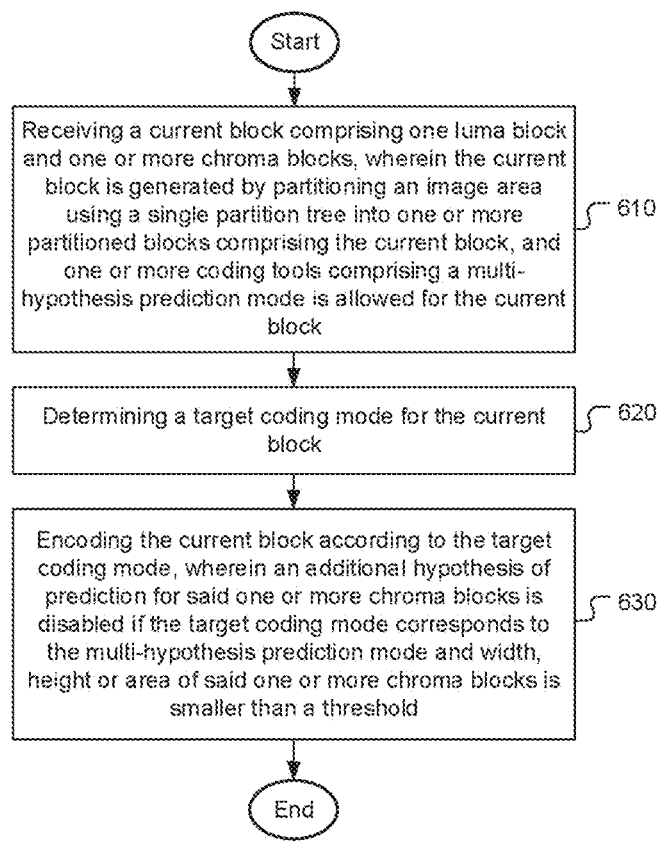
FIG. 6 illustrates a flowchart of an exemplary prediction for video encoding according to an embodiment of the present invention, where the additional hypothesis of prediction is disabled for small chroma blocks.

FIG. 6 illustrates a flowchart of an exemplary prediction for video encoding according to an embodiment of the present invention, where the additional hypothesis of prediction is disabled for small chroma blocks (the existing prediction is used as the final prediction for the small chroma blocks). The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a current block comprising one luma block and one or more chroma blocks is received in step 610, wherein the current block is generated by partitioning an image area using a single partition tree into one or more partitioned blocks comprising the current block, and one or more coding tools comprising a multi-hypothesis prediction mode is allowed for the current block. The single partition tree is a single tree for luma and chroma. A target coding mode for the current block is determined in step 620. The current block is encoded according to the target coding mode in step 630, wherein an additional hypothesis of prediction for said one or more chroma blocks is disabled if the target coding mode corresponds to the multi-hypothesis prediction mode and width, height or area of said one or more chroma blocks is smaller than a threshold.

Figure 7:
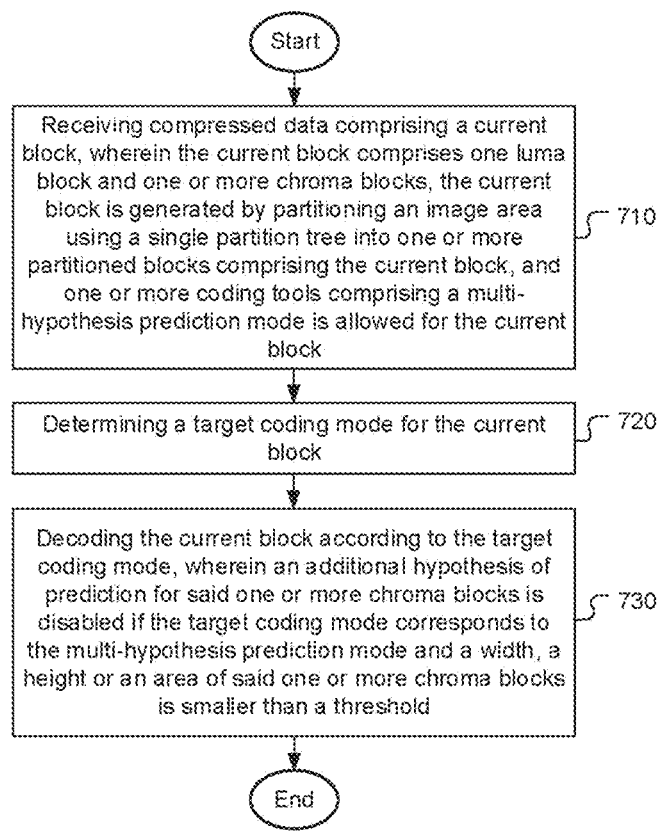
FIG. 7 illustrates a flowchart of an exemplary prediction for video decoding according to an embodiment of the present invention, where the additional hypothesis of prediction is disabled for small chroma blocks.

FIG. 7 illustrates a flowchart of an exemplary prediction for video decoding according to an embodiment of the present invention, where the additional hypothesis of prediction is disabled for small chroma blocks (the existing prediction is used as the final prediction for the small chroma blocks). According to this method, compressed data comprising a current block are received in step 710, wherein the current block comprises one luma block and one or more chroma blocks, the current block is generated by partitioning an image area using a single partition tree into one or more partitioned blocks comprising the current block, and one or more coding tools comprising a multi-hypothesis prediction mode is allowed for the current block. The single partition tree is a single tree for luma and chroma. A target coding mode for the current block is determined in step 720. The current block is decoded according to the target coding mode in step 730, wherein an additional hypothesis of prediction for said one or more chroma blocks is disabled if the target coding mode corresponds to the multi-hypothesis prediction mode and width, height or area of said one or more chroma blocks is smaller than a threshold.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding, the method comprising:
receiving a current block comprising one luma block and one or more chroma blocks, wherein the current block is generated by partitioning an image area using a single partition tree into one or more partitioned blocks comprising the current block, and one or more coding tools comprising a multi-hypothesis prediction mode including an existing hypothesis of prediction is allowed for the current block;
determining a target coding mode for the current block, the target coding mode is determined by combining the existing hypothesis of prediction in the multi-hypothesis prediction mode with an additional hypothesis of prediction for the one or more chroma blocks by a weighted average process, the additional hypothesis of prediction is a prediction mode different from the existing hypothesis of prediction included in the multi-hypothesis prediction mode, and, in response to a width, a height, or an area of the one or more chroma blocks being smaller than a threshold, disabling the additional hypothesis of prediction included in the target coding mode; and
encoding the current block according to the target coding mode.

2. The method of claim 1, wherein the additional hypothesis of prediction is Intra prediction and the Intra prediction for said one or more chroma blocks is disabled if the width of said one or more chroma blocks is smaller than the threshold equal to 4.

3. The method of claim 1, wherein the multi-hypothesis prediction mode corresponds to Combined Inter/Intra Prediction (CIIP) mode.

4. The method of claim 1, wherein the multi-hypothesis prediction mode corresponds to Triangular Prediction mode (TPM).

5. The method of claim 1, wherein the multi-hypothesis prediction mode corresponds to Geometric Merge mode (GEO).

6. The method of claim 1, wherein the current block is in chroma format 4:4:4, 4:2:2 or 4:2:0.

7. The method of claim 1, wherein the threshold is signalled at a Transform Unit (TU) or Transform Block (TB), Coding Unit (CU) or Coding Block (CB), Coding Tree Unit (CTU) or Coding Tree Block (CTB), slice, tile, tile group, Sequence Parameter Set (SPS), Picture Parameter Set (PPS), or picture level of a video bitstream.

8. The method of claim 1, wherein the image area corresponds to a Coding Tree Unit (CTU).

9. An apparatus of video encoding, the apparatus comprising one or more electronic circuits or processors arranged to:
receive a current block comprising one luma block and one or more chroma blocks, wherein the current block is generated by partitioning an image area using a single partition tree into one or more partitioned blocks comprising the current block, and one or more coding tools comprising a multi-hypothesis prediction mode including an existing hypothesis of prediction is allowed for the current block;
determine a target coding mode for the current block, the target coding mode is determined by combining the existing hypothesis of prediction in the multi-hypothesis prediction mode with an additional hypothesis of prediction for the one or more chroma blocks by a weighted average process, the additional hypothesis of prediction is a prediction mode different from the existing hypothesis of prediction included in the multi-hypothesis prediction mode, and, in response to a width, a height, or an area of the one or more chroma blocks being smaller than a threshold, disabling the additional hypothesis of prediction included in the target coding mode; and
encode the current block according to the target coding mode.

10. A method of video decoding, the method comprising:
receiving compressed data comprising a current block, wherein the current block comprises one luma block and one or more chroma blocks, the current block is generated by partitioning an image area using a single partition tree into one or more partitioned blocks comprising the current block, and one or more coding tools comprising a multi-hypothesis prediction mode including an existing hypothesis of prediction is allowed for the current block;
determining a target coding mode for the current block, the target coding mode is determined by combining the existing hypothesis of prediction in the multi-hypothesis prediction mode with an additional hypothesis of prediction for the one or more chroma blocks by a weighted average process, the additional hypothesis of prediction is a prediction mode different from the existing hypothesis of prediction included in the multi-hypothesis prediction mode, and, in response to a width, a height, or an area of the one or more chroma blocks being smaller than a threshold, disabling the additional hypothesis of prediction included in the target coding mode; and
decoding the current block according to the target coding mode.

11. The method of claim 10, wherein the additional hypothesis of prediction is Intra prediction and the Intra prediction for said one or more chroma blocks is disabled if the width of said one or more chroma blocks is smaller than the threshold equal to 4.

12. The method of claim 10, wherein the multi-hypothesis prediction mode corresponds to Combined Inter/Intra Prediction (CIIP) mode.

13. The method of claim 10, wherein the multi-hypothesis prediction mode corresponds to Triangular Prediction mode (TPM).

14. The method of claim 10, wherein the multi-hypothesis prediction mode corresponds to Geometric Merge mode (GEO).

15. The method of claim 10, wherein the current block is in chroma format 4:4:4, 4:2:2 or 4:2:0.

16. The method of claim 10, wherein the threshold is parsed at a Transform Unit (TU) or Transform Block (TB), Coding Unit (CU) or Coding Block (CB), Coding Tree Unit (CTU) or Coding Tree Block (CTB), slice, tile, tile group, Sequence Parameter Set (SPS), Picture Parameter Set (PPS), or picture level of a video bitstream.

17. The method of claim 10, wherein the image area corresponds to a Coding Tree Unit (CTU).

18. An apparatus of video decoding, the apparatus comprising one or more electronic circuits or processors arranged to:

receive compressed data comprising a current block, wherein the current block comprises one luma block and one or more chroma blocks, the current block is generated by partitioning an image area using a single partition tree into one or more partitioned blocks comprising the current block, and one or more coding tools comprising a multi-hypothesis prediction mode including an existing hypothesis of prediction is allowed for the current block;

determine a target coding mode for the current block, the target coding mode is determined by combining the existing hypothesis of prediction in the multi-hypothesis prediction mode with an additional hypothesis of prediction for the one or more chroma blocks by a weighted average process, the additional hypothesis of prediction is a prediction mode different from the existing hypothesis of prediction included in the multi-hypothesis prediction mode, and, in response to a width, a height, or an area of the one or more chroma blocks being smaller than a threshold, disabling the additional hypothesis of prediction included in the target coding mode; and and decode the current block according to the target coding mode.

\* \* \* \* \*